(12) United States Patent
McAllister et al.

(10) Patent No.: US 6,227,475 B1
(45) Date of Patent: May 8, 2001

(54) TAPE THREADING APPARATUS

(75) Inventors: Jeffrey S. McAllister; Geoffrey W. Mansbridge; Curtis P. Gonzales, all of Boise, ID (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

(21) Appl. No.: 09/519,955

(22) Filed: Mar. 7, 2000

Related U.S. Application Data (62) Division of application No. 09/121,766, filed on Jul. 23, 1998, now abandoned.

(51) Int. Cl.[7] .................................................. G11B 15/66
(52) U.S. Cl. .................................... 242/332.7; 242/332.4; 242/332.8
(58) Field of Search .............................. 242/332.7, 332.8, 242/532.1, 532.6, 332.4, 582, 587.2

(56) References Cited

U.S. PATENT DOCUMENTS

| | | |
|---|---|---|
| 2,742,243 | 4/1956 | Kelley . |
| 3,185,401 | 5/1965 | Hardy . |
| 3,664,607 | 5/1972 | Trefzger et al. . |
| 4,432,508 | 2/1984 | Inoue et al. . |
| 4,662,049 | 5/1987 | Hertich . |

Primary Examiner—John Q. Nguyen (57) ABSTRACT

A tape threading apparatus for use with a single reel cartridge of source tape allows leader tape to be spooled onto an inner leader drum, and source tape to be spooled on to an outer take-up drum. The apparatus has a take-up reel having an outer drum configured to accept source tape. The apparatus further includes a leader drum which is supported essentially concentric with and at least partially rotatable with respect to the outer drum. The leader tape has a first end attached to the leader drum and a second end provided with a tape connector which can be connected to the source tape. The outer drum has a leader tape opening to allow leader tape to pass freely from the leader drum to the outside of the outer drum. The leader tape opening is configured to prevent passage of the tape connector therethrough. In a first embodiment, the leader drum is configured to be driven by a drive motor. Engagement of the tape connector into the tape opening causes the force imparted on the leader drum by a drive motor to be imparted to the outer drum, causing the outer drum to rotate and spool the source tape onto the outer drum. In a second embodiment, the apparatus further includes a spring having a first connection point connected to the leader drum and a second connection point connected to the take-up reel. Extension of the leader tape from the take-up reel causes compression of the spring such that when the source tape is connected to the tape connector and released, the spring causes the leader tape to be spooled onto the inner leader drum and the tape connector to be engaged into the opening in the outer drum. Thereafter, rotation of the outer drum will cause the source tape to be spooled onto the outer drum.

6 Claims, 6 Drawing Sheets

TAPE THREADING APPARATUS

CROSS REFERENCE TO RELATED APPLICATIONS

This application is a division of U.S. patent application Ser. No. 09/121,766, filed Jul. 23, 1998, abandoned.

FIELD OF THE INVENTION

This invention pertains to apparatus for handling readable tape which is spooled onto a reel, and more specifically to a tape threading apparatus which works in conjunction with a single reel cartridge.

BACKGROUND OF THE INVENTION

Figure 1:
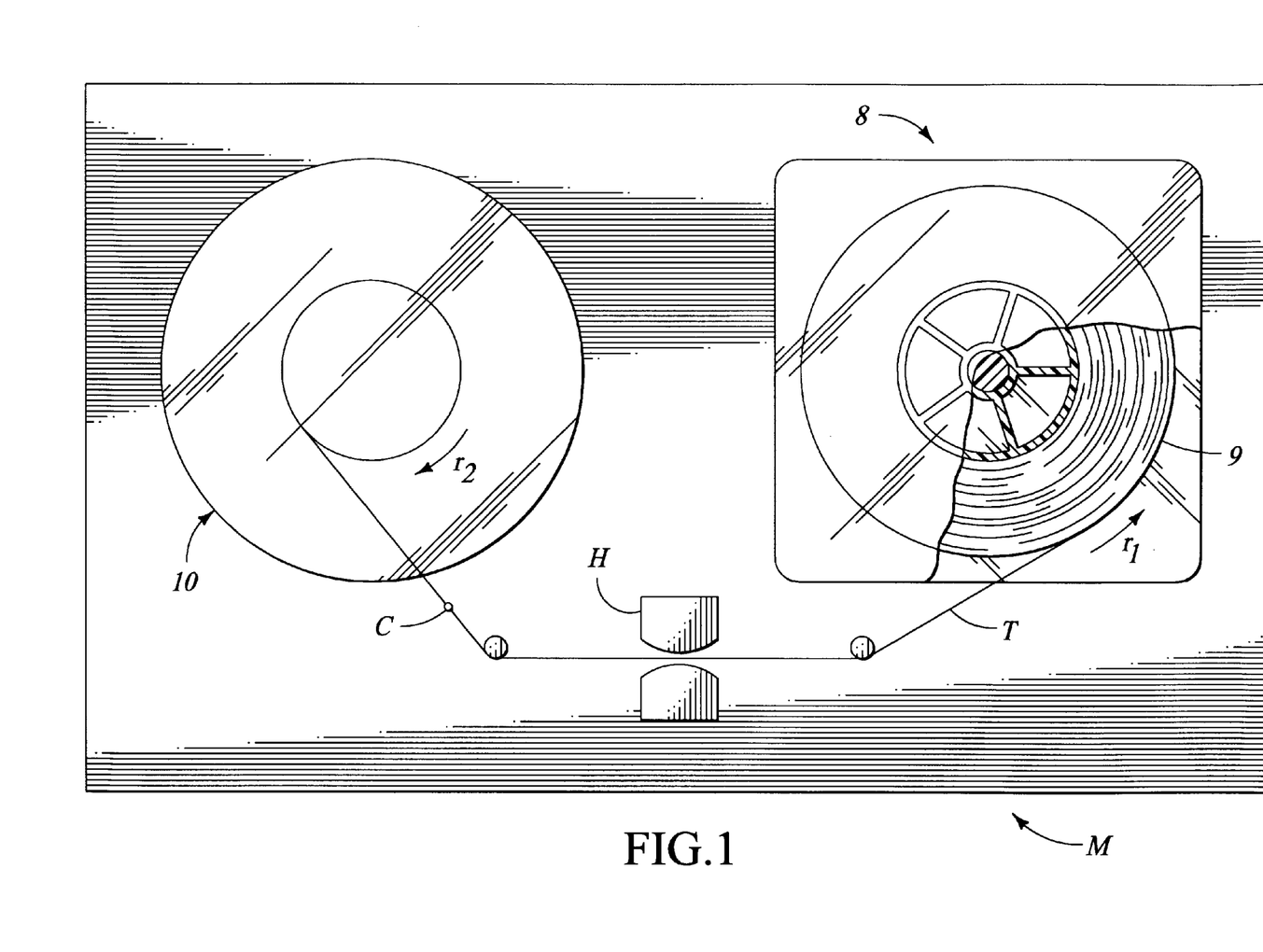
FIG. 1 is an environmental view of a tape reading apparatus in which the present invention can be used.

Data, programs, and other information are often stored on tape such as magnetic tape. In order to reduce the storage requirements for these magnetic tapes, it is common to manufacture a single reel cartridge. That is, the cartridge has only a reel or a spool which holds the magnetic tape and does not comprise a take-up spool. Turning to FIG. 1, such a configuration is shown wherein a single 10 reel tape cartridge 8 comprising a source reel 9 provides tape T to a take-up reel 10. The tape T passes through a magnetic reader such as the head H before being spooled onto the take-up reel 10. Once the desired portion of the source tape has been read, the tape is rewound into the single reel tape cartridge 8 which can be removed from the machine M.

When a single reel tape cartridge is used, the tape T must be connected to the take-up reel 10. Two primary methods have been used for doing this in the past. The first method uses a linkage and cam mechanism to capture a leader block or tape connector on the end of the source tape and place it into the take-up hub. One surface of the leader block then forms part of the winding surface of the hub. This threading mechanism requires extra space, which is not available in a small-form-factor drive. This device also requires a first motor to drive the take-up reel as well as a second motor and mechanism to activate the linkage and cam mechanism. The addition of these components adds cost and complexity to the take-up drive.

Figure 2:
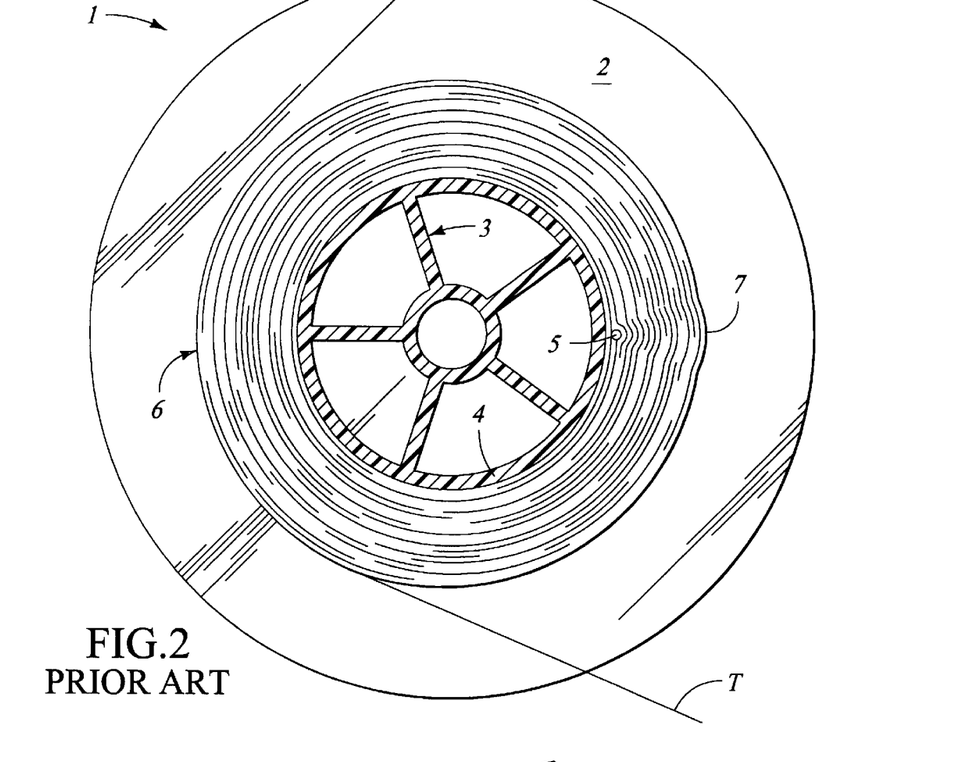
FIG. 2 is a plan sectional view of a prior art tape take-up reel.
Figures 3, 3A:
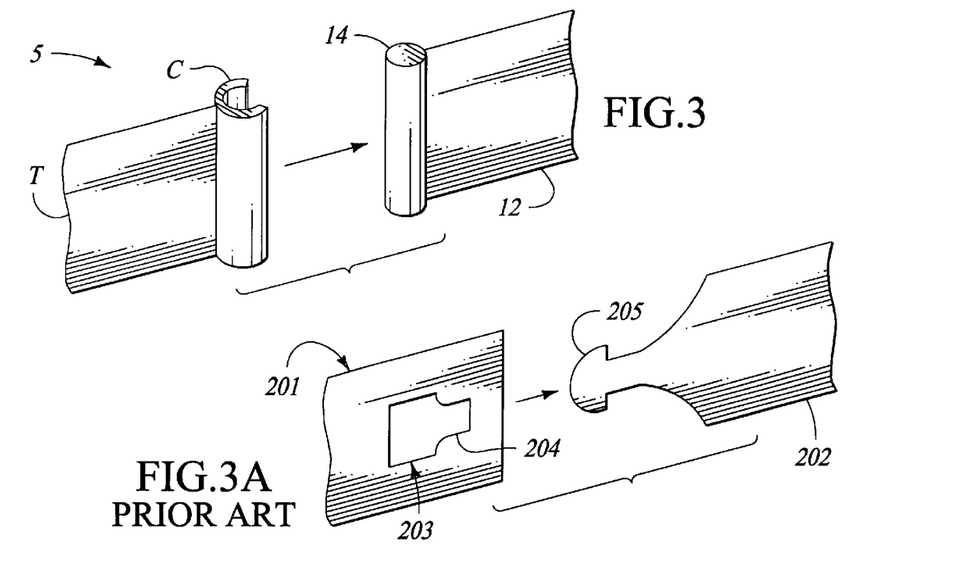
FIG. 3 is a detail isometric view of a tape connector which can be used in the present invention.
FIG. 3A is a drawing showing how prior art tape leaders are connected to tapes.

A second method for threading source tape onto a take-up reel uses a threading leader. A threading leader is a short piece of tape which is attached to the take-up hub. The threading leader and the source tape are then connected and wound onto the take-up hub. In so doing, the tape connector is also wound onto the take-up hub. This situation is shown in FIG. 2 which shows the prior art just described. A take-up reel 1 has a lower flange 2 which is used to support the tape T which is spooled on the reel about a take-up hub 4. The tape is connected to a leader tape by tape connector. If a tape connector such as that shown in FIG. 3 is used, then as the tape builds up on the take-up hub 4, the outer surface of the spooled tape 6 will take on a distinct bump or bulge 7 at the location of the tape connector. Further, the irregularity 7 in the tape outer surface 6 reduces the accuracy of the winding surface. This can be important when location of data on tape is identified by the number of revolutions of the take-up spool, it being known the approximate average thickness of the tape and the outside diameter of the take-up hub 4. When an irregularity such as tape connector 5 is introduced, the outer surface 6 of the spooled tape becomes a longer path than the calculations for the probable location of data on the tape would indicate.

One solution to this problem is found in U.S. Pat. No. 4,662,049 (Hertrich). The general style of the Hertrich tape connector is shown in FIG. 3A. Generally, the solution described in Hertrich is for a first tape end (either the leader tape or the source tape) 201 to be provided with an opening 203 having a tapered end 204. A second tape end (being either the source tape or the leader, respectively), has a shaped end 205 which is configured to fit within opening 203 and engage in the tapered slot 204. Such a configuration does provide a much flatter connection in that the resulting connection is ideally only two tape thicknesses thick. However, such configuration provides a relatively weak tape connection, which may be easily undone by modest tensions, which can be provided to the tape by the winding motors themselves.

Thus, what is needed is a reliable method for connecting the tape from a single reel cartridge onto a take-up reel which is relatively simple and results in a consistent tape winding surface, and provides a relatively strong connection between the leader tape and the source tape.

SUMMARY OF THE INVENTION

The invention includes a tape threading apparatus which can be used in tape handling, as, for example, in handling magnetic tape in a tape reader. Specifically, the tape threading apparatus is particularly useful in conjunction with a single reel cartridge.

The tape threading apparatus comprises a tape take-up reel having an outer drum configured to accept spoolable tape in a spooled manner. A leader drum which is configured to accept leader tape in a spoolable manner is supported essentially concentric with and at least partially rotatable with respect to the outer drum. A leader tape having a first end is engaged with the leader drum. A second end of the leader tape is provided with a tape connector. The outer drum has a leader tape opening disposed therein and configured to allow free passage of a portion of the leader tape therethrough. The tape opening is configured to prevent passage of the tape connector therethrough.

In a first embodiment of the invention, the outer drum comprises an essentially hollow cylinder. The leader drum is supported within the hollow portion of the outer drum by at least one bearing which is disposed about the periphery of the leader drum and within the hollow drum, thus supporting the outer drum essentially concentric with and at least partially rotatable with respect to the leader drum. In a second embodiment of the invention, the take-up reel further comprises a spring having a first connection point connected to the leader drum and a second connection point connected to the take-up reel. This spring can be biased to cause relative rotation between the leader drum and the outer drum.

DETAILED DESCRIPTION OF THE INVENTION

The tape threading apparatus of the present invention consists of a take-up reel which has an outer hub or cylinder onto which is wound the tape from the source, which can be a single reel cartridge. The outer drum is preferably a hollow cylinder having an open center portion. The take-up reel further comprises a take-up hub or leader drum which is mounted within the hollow open portion of the outer drum.

The take-up hub is configured to be at least partially rotatable with respect to the outer drum. Leader tape is wound onto the leader drum. The leader tape passes from the hollow inner portion of the outer drum to the outside surface of the outer drum through a tape opening which is essentially a gap within the outer drum. The leader tape terminates in a leader block or tape connector which can be connected to the source tape. The tape opening within the outer drum is configured to engage the leader block such that the leader block does not pass through the tape opening, and further that the leader block does not protrude above the outer surface of the take-up drum. Thus, leader tape is wound onto the leader drum while the source tape is wound onto the outer drum. Two specific embodiments of this invention are described herein.

Although the invention is described particularly as being used with spoolable tape such as magnetic tape, and more particularly with a single reel tape cartridge, it is understood that the tape threading system described and disclosed herein can be used within any spoolable medium such as celluloid film.

Figure 4:
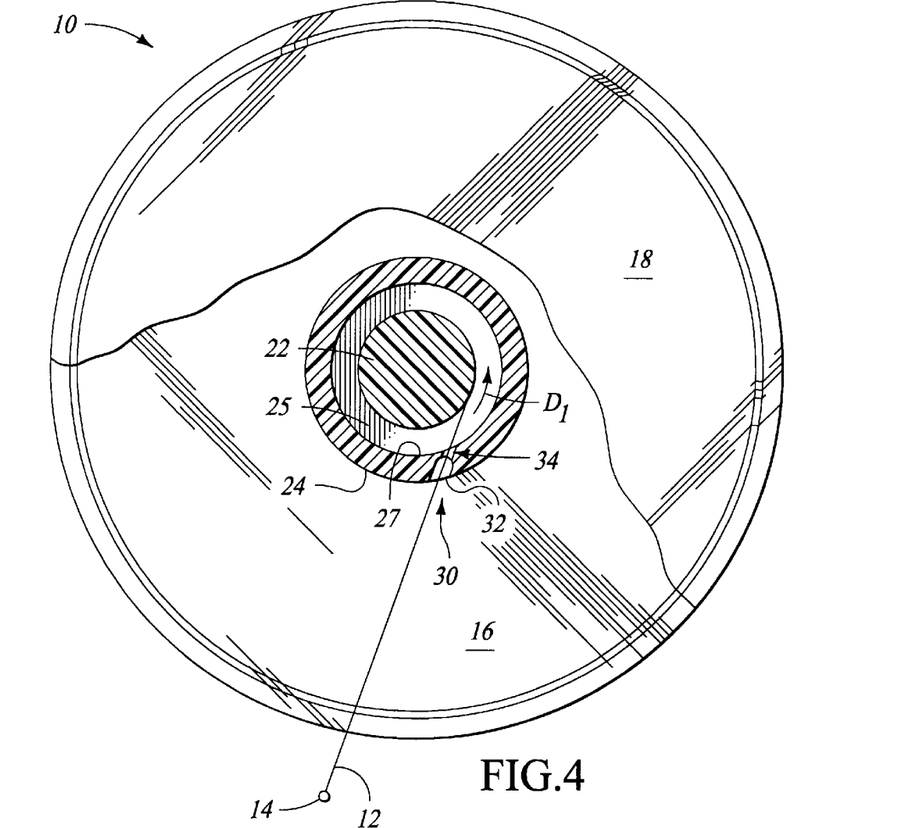
FIG. 4 is a plan partial sectional view of a tape take-up reel in accordance with one embodiment of the present invention.

In the first embodiment shown in FIG. 4, the tape reel 10 comprises an upper flange 18 and a lower flange 16. Upper flange 18 and lower flange 16 are used to constrain the tape which is spooled onto the take-up reel. The take-up reel further comprises an outer drum 24. Outer drum 24 can alternately be known as a take-up drum or an outer hub. The outer drum 24 defines a hollow inner portion 25.

Disposed within the hollow portion 25 is the take-up hub 22. The take-up hub 22 can alternately be known and described herein as the leader drum. The leader drum is mounted with respect to the outer drum 24 in such a manner as to be at least partially rotatable with respect to the outer drum. Preferably outer drum 24 and leader drum 22 are both mounted on the cylindrical axis of symmetry 23.

Figure 5:
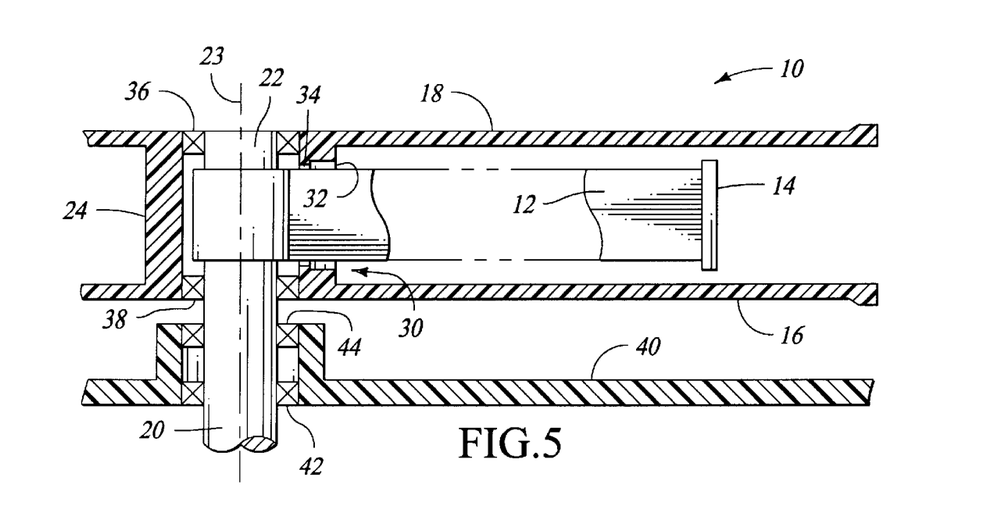
FIG. 5 is a side elevation sectional view of the tape take-up reel of FIG. 4.

Turning to FIG. 5, a side sectional view of the take-up reel of FIG. 4 is shown. The take-up hub 22 is preferably mounted within the outer drum 24 by bearings 36 and 38. Preferably bearings 36 and 38 are ball bearings having an outer race attached to the inner surface 27 of the outer drum 24, and an inner race attached to the take-up hub 22. Without by way of limitation, examples of other bearing types which can be used include plain bearings, sleeve bearings and needle bearings. Preferably, the bearings 36 and 38 are precision bearings to maintain concentricity of the take-up hub 22 and the outer drum 24.

The take-up hub 22 preferably extends into and is a part of drive shaft 20 which can be connected to a drive motor (not shown). The drive shaft 20 can further be supported by base 40 and support bearings 42 and 44 to provide additional stability to the take-up hub portion 22 of the shaft 20. Reviewing FIG. 5 it is easily seen that take-up hub 22 can rotate freely with respect to outer drum 24.

Briefly returning to FIG. 4, it is seen that leader tape 12 is attached to the take-up drum 22 at its outer periphery. Leader tape 12 passes through tape opening 30.

Figure 6:
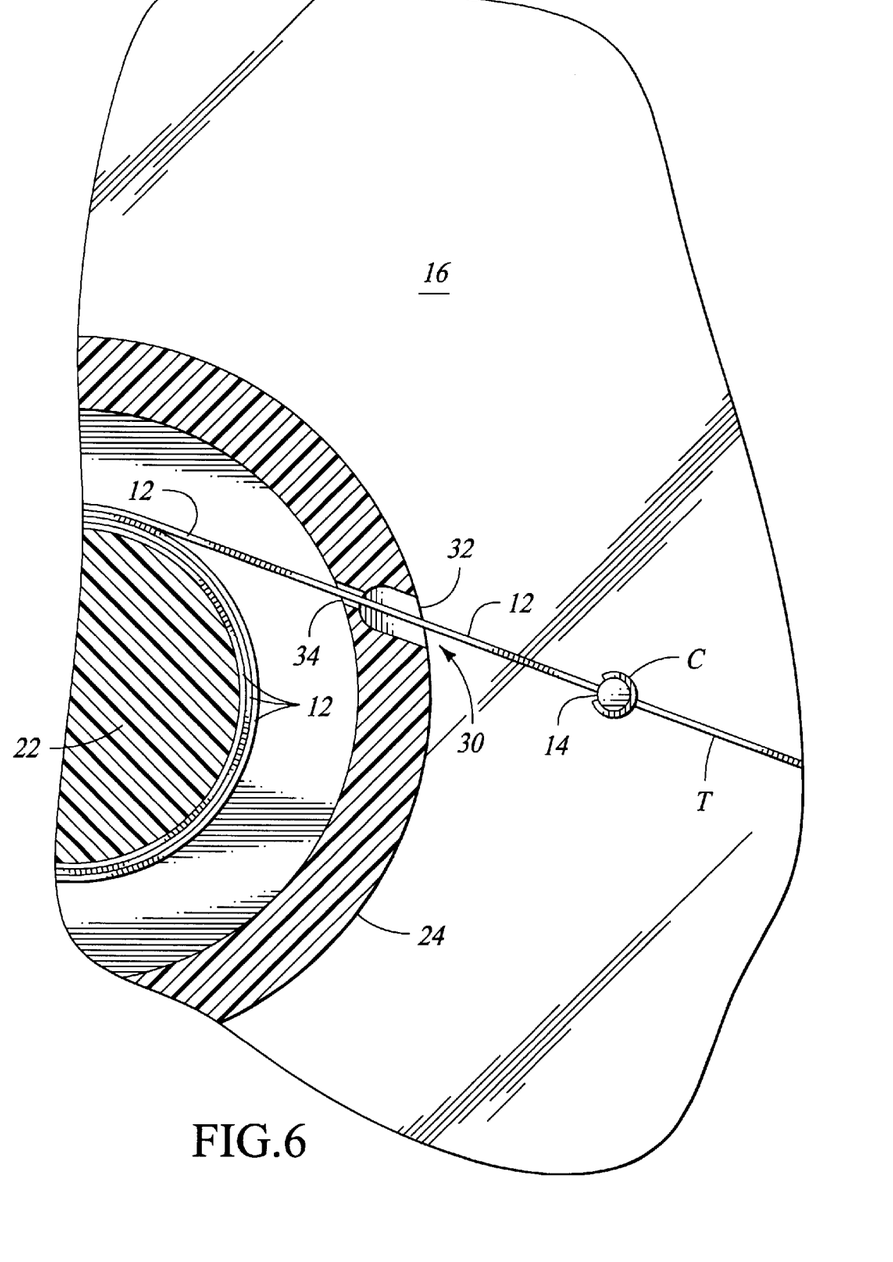
FIG. 6 is a detail plan view of the tape opening of the tape take-up reel shown in FIG. 4.

Turning to FIG. 6, a detail of tape opening 30 is shown. Tape opening 30 passes through outer drum 24 and comprises a first slot 34 which is of sufficient width to allow the passage of the tape 12. The tape opening 30 further comprises a second slot 32 which is sufficient in size to accommodate the tape connector C from the source tape T as well as the tape connector portion 14 from the leader tape 12.

A detail showing how the tape connector C and the leader block 14 fit together is shown in FIG. 3.

The tape connector shown in FIG. 3 is for exemplary purposes only. It is understood that any tape connector which works to engage one end of a source tape to one end of a leader tape can be provided. The tape connector is preferably of a size that the take-up hub 24 can be modified to engage the geometry of the tape connector without resulting in an irregular surface in the outer surface of the take-up drum 24.

In operation, when a tape cartridge or source tape 8 as shown in FIG. 1 is mounted on machine M, the leader tape 12 of FIG. 6 is extended and leader tape connection 14 is engaged with source tape connection C in the manner shown. A take-up motor is then activated in order to cause the shaft 20 to rotate in direction D1 as shown in FIG. 4. This causes the leader tape 12 to be wound onto the take-up hub 22, thus drawing the tape connector 14 closer to the tape opening 30.

During the time that the leader 12 is being wound onto the take-up drum 22, frictional forces in the bearings 36 and 38 between the take-up hub 22 and the outer drum 24 can cause the outer drum to have a torque applied to it in the direction of rotation of the take-up drum. However, rotation of the take-up drum 24 is prevented as one side of the slot 30 will be pressed against the leader tape 12 as the outer drum 24 rotates in the direction of the take-up drum. Once the outer drum has engaged the leader tape, it will be prevented from rotating further.

This can be seen by viewing FIG. 6, which shows a top view of the tape opening 30 and how it would engage the leader tape 12. One alternate method for preventing rotation of the outer drum 24 is to have a separate motor apply a small counter-rotational force to the outer drum. This is less preferable since it requires the addition of another drive motor. Another alternate method of preventing rotation of the outer drum 24 while leader tape is passing through opening 30 is to provide a mechanical lock to secure outer drum 24 with respect to the rotating take-up hub 22.

Once the leader block 14 has engaged the second opening 32 of tape opening 30, the take-up hub, driven by the take-up motor, will no longer be able to draw tape through the tape opening 30. At this point, the tension in that portion of the leader tape between the tape opening 30 and the take-up drum 22 will cause the outer drum 24 to rotate due to the eccentric force applied by the leader tape to the tape connector and the outer drum. This will cause rotation of the outer drum in the same direction as rotation of the inner drum, causing source tape to be spooled onto the take-up drum 24 in a spooled manner. Thus, two separate rotatable surfaces have been provided using only a single drive motor. Further, a smooth take-up surface has been provided for the source tape to be spooled onto.

In a variation on the first embodiment, the take-up drum 22 can be separate and distinct from the drive shaft 20. This would allow the take-up reel 10 to be removable from the drive shaft 20. Such may be desired when transferring tape from a first reel to a second reel. Such may also be desirable to facilitate servicing of the tape drive machine.

Figure 7:
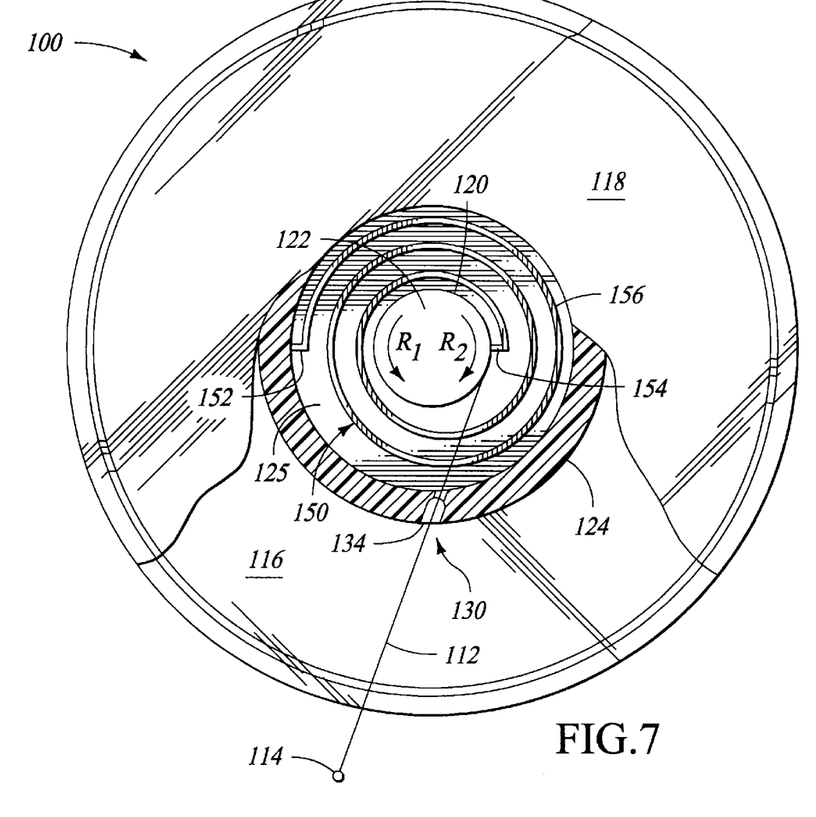
FIG. 7 is a plan partial sectional view of a tape take-up reel in accordance with a second embodiment of the present invention.

A second embodiment of the present invention is shown in FIG. 7. Similar to the take-up reel 10 of FIG. 4, the take-up reel 100 of FIG. 7 comprises an upper flange 118 and a lower flange 116 which are used to constrain the source tape which is spooled onto the take-up reel 100. The take-up reel further comprises a outer drum 124 onto which the source tape can be spooled. The outer drum is preferably a hollow cylindrical section defining an open central portion. Disposed within the open central portion 125 is the take-up hub or leader drum 122. The take-up hub is preferably concentrically mounted with respect to the outer drum 124 on cylindrical axis 123. The leader drum is further mounted with respect to the outer drum such that the leader drum is at least partially rotatable with respect to the outer drum. The tape threading apparatus of FIG. 7 further comprises a recoil spring mechanism 150. Recoil spring 150 is engaged at a first end 154 with the leader drum 122. The recoil spring 150 is attached at a second end 152 to the outer drum 124. The spring is configured such that in a neutral position it establishes a determined rotational positional relationship between inner hub 122 and outer drum 124. Rotation of the inner drum 122 with respect to the outer drum 124 in either direction will cause the spring to be biased away from the initial determined position, such that the spring is urged back to the neutral position.

Figure 9:
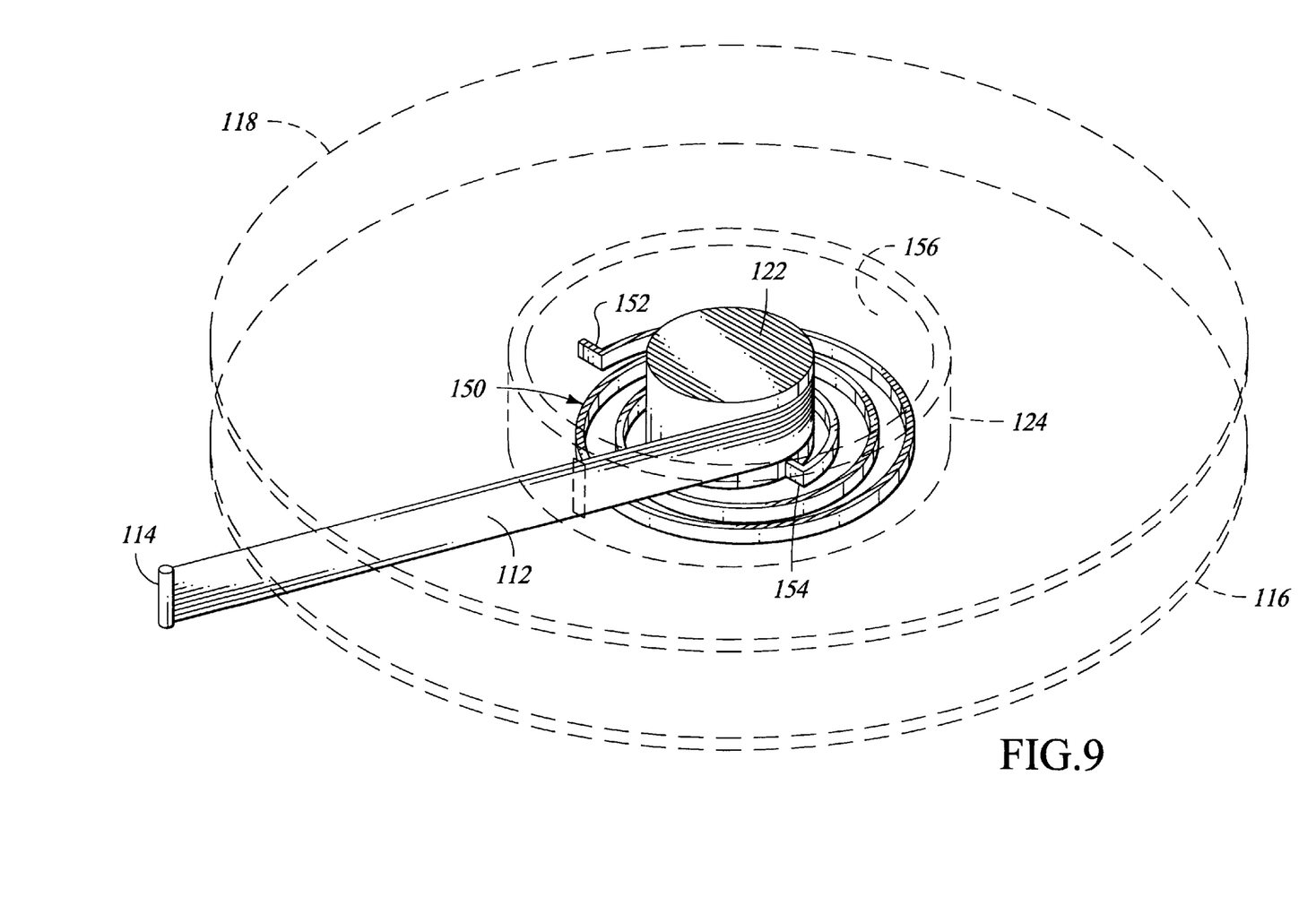
FIG. 9 is a isometric detail of the recoil spring of the tape take-up reel of FIG. 7.

Turning to FIG. 9, an isometric detail diagram of the recoil spring 150 and its relationship to the leader tape 112 and the leader drum 122 is shown. Although in the drawings the spring mechanism shown is a radial spring, it is understood that alternate spring mechanisms can be employed, the objective being to cause relative rotation of the inner hub 122 with respect to the outer drum 124. Preferably, the spring mechanism is configured to provide a plurality of rotations of the inner hub 122 with respect to the outer drum 124 to cause the leader tape 112 to be securely engaged onto the inner hub 122.

Outer drum 124 is further provided with tape opening 130. Tape opening 130 comprises a first opening 132 which is configured to allow leader tape 112 to pass therethrough without allowing the tape connector 114 to pass therethrough. Tape opening 130 is further provided with tape connector opening 134 which is of sufficient size to receive the tape connector 114 and C of FIG. 3, yet maintain an essentially continuously smooth outer surface of the take-up hub 124 when the tape connector is engaged in the tape connector opening 134. As with the first embodiment of the invention, various designs of leader blocks can be used so long as they engage the outer drum 124 to produce an essentially smooth continuous outer surface, allowing the source tape to be wound onto that surface.

Figure 8:
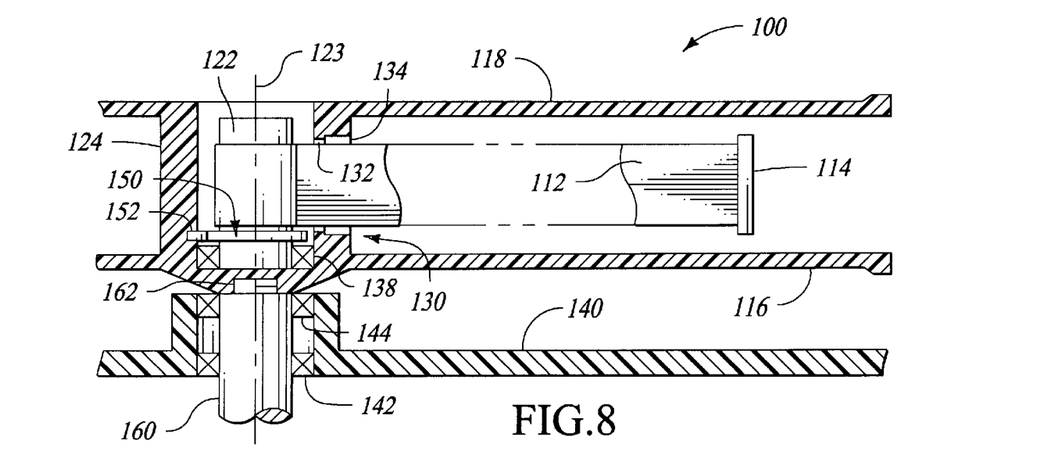
FIG. 8 is a side elevation sectional view of the tape take-up reel of FIG. 7.

Turning to FIG. 8, a side sectional view of the tape threading apparatus of FIG. 7 is shown. The take-up reel 100 is shown in this embodiment as being a separate reel which can be removed and detached from a drive shaft 160 at connector 162.

Connector 162 is configured to engage the lower flange 116 of the take-up reel 100. Drive shaft 160 is driven by a motor (not shown). The drive shaft extends through base 140 and can be supported by bearings 142 and 144 in order to provide stability for the drive shaft. In this way it is the outer drum 124 which is directly driven and not the inner drum 122. This should be contrasted with FIG. 5 which shows the first embodiment of the invention wherein the leader drum or take-up hub 22 is driven and the outer drum 24 is free with respect to the leader drum. Returning to FIG. 8, the leader drum 122 is mounted in bearing 138 which is set into the bottom of the hollow central portion 125 of the take-up drum 124.

The outer race of bearing 138 can be rigidly connected to the inner cylindrical wall of the take-up drum 124 while the inner race of bearing 138 can be rigidly attached to the outer periphery of leader drum 122. Located slightly above the bearing 138 is the recoil spring 150. As seen, the recoil spring 150 engages the outer drum 124 at engagement point 152. The engagement point 154 of spring 150 with the take-up hub 122 is not shown in FIG. 8 but is shown in the plan view of FIG. 7.

Returning to FIG. 8, the leader tape 112 is attached to the take-up hub 122 above the recoil spring 150. There is no particular order in which the bearing, recoil spring and tape leader must be connected to the take-up hub 122, although the configuration shown in FIG. 8 is the preferred arrangement for reduction of vibration and ease of maintenance. A second bearing can be provided above the point at which the leader tape 112 is attached to the take-up hub 122 if additional isolation from vibration is desired.

In operation, the leader tape 112 is extended from the take-up reel 100 in the manner shown in FIG. 7. As the threading leader 112 is pulled away from the leader block engagement slot 134, the inner hub 122 is caused to rotate in direction $R_2$. This causes a bias of the spring in the rotational direction $R_1$. Once extended, the leader tape is secured in an extended position by attaching tape connector 114 to an anchor. When a source tape cassette is connected to the tape reading machine as shown in FIG. 1, a tape connector on the source tape is engaged with the tape connector 114 of the threading leader 112. An exemplary tape connection is shown in FIG. 3. Preferably, at this point, the drive motor which is attached to the source cassette is activated to provide a small rotational force in the direction $r_1$ as shown in FIG. 1. When the tape connector 114 is released from its anchor, the spring force of the recoil spring 150 will cause the inner hub 122 of the take-up reel 100 to rotate in direction $R_1$. The force applied by the recoil spring 150 is configured to be greater than the small rotational force applied by the motor to the source reel 9. Applying the opposite force to the source reel 9 ensures that the source tape will be held in a taut position during spooling onto the take-up reel 100. It is understood that the invention can be practiced without applying this reverse rotational force to the source reel, although in the preferred embodiment such a reverse force is applied. The recoil spring continues to wind the threading leader onto the leader drum 122 until the leader block 114 is engaged in the leader block opening 134. At this point, the drive motor which is used to drive the take-up reel 100 can be engaged and cause the source tape T to be spooled onto the take-up drum 124. In rewind mode, the drive motor on the take-up reel is disengaged (or a small counter-rotational force is applied) and the drive motor on the source reel is used to rewind the source tape from the take-up reel back onto the source reel 9 of FIG. 1. At the end of the rewind, the leader tape 112 is wound off of the leader hub 122 causing rotation of the inner hub in direction $R_2$, causing the spring to be biased in direction $R_1$ and ready to receive a new tape in the manner just described.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A tape threading apparatus, comprising:
   a take-up reel comprising an essentially hollow, cylindrical outer drum configured to accept spoolable tape in a spooled manner;
   a cylindrical leader drum positioned inside said outer drum;
   at least one bearing disposed about the leader drum and disposed within the hollow outer drum to support the outer drum essentially concentric with and at least partially rotatable with respect to the leader drum;
   a leader tape having a first end engaged with the leader drum, and a second end comprising a tape connector; and
   wherein:
   the outer drum comprises a leader tape opening disposed therein, the leader tape opening is configured to allow free passage of a portion of the leader tape therethrough;
   the tape opening is configured to prevent passage of the tape connector therethrough; and
   only the outer drum is configured to be directly engaged by a drive shaft of a drive motor.

2. The tape threading apparatus of claim 1 further comprising a spring mechanism having a first connection point connected to the leader drum and a second connection point connected to the take-up reel, the spring mechanism being biasable to cause relative rotation between the leader drum and the outer drum.

3. The tape threading apparatus of claim 2 wherein the spring mechanism comprises a spiral spring.

4. The tape threading apparatus of claim 2 wherein:
   the leader drum is essentially cylindrical in shape and comprises a primary cylindrical axis of symmetry;
   the leader tape is engaged with the leader drum such that rotation of the leader drum about the primary cylindrical axis of symmetry will cause leader tape to be spooled onto the leader drum; and
   the spring mechanism is biased to cause the leader drum to rotate relative to the outer drum to a position where the leader tape is spooled onto the leader drum and the tape connector is engaged within the leader tape opening.

5. The tape threading apparatus of claim 4 wherein:
   the spring mechanism exerts a maximum selected torque on the outer drum in a first rotational direction relative to the leader drum; and
   the drive motor is engaged with the outer drum and configured to drive the outer drum in a direction opposite the first rotational direction, the drive motor being further configured to exert a torque on the outer drum approximately equal to the maximum selected torque exerted on the outer drum by the spring mechanism.

6. A tape threading apparatus, comprising:
   a take-up reel comprising an outer drum configured to accept spoolable tape in a spooled manner;
   a leader drum positioned inside said outer drum and supported essentially concentric with and at least partially rotatable with respect to the outer drum;
   a leader tape having a first end engaged with the leader drum, and a second end comprising a tape connector;
   a spring mechanism having a first connecting point connected to the leader drum and a second connecting point connected to the take-up reel, the spring mechanism being biasable to cause relative rotation between the leader drum and the outer drum;
   wherein:
   the outer drum comprises a leader tape opening disposed therein, the leader tape opening configured to allow free passage of a portion of the leader tape therethrough;
   the tape opening is configured to prevent passage of the tape connector therethrough; and
   only the outer drum is configured to be directly engaged by a drive shaft of a drive motor.

* * * * *